(12) United States Patent
Bartos et al.

(10) Patent No.: US 11,774,229 B2
(45) Date of Patent: Oct. 3, 2023

(54) EDDY CURRENT SENSOR DEVICE FOR MEASURING A LINEAR DISPLACEMENT

(71) Applicant: TE Connectivity Sensors Germany GmbH, Dortmund (DE)

(72) Inventors: Axel Bartos, Dortmund (DE); Reinhold Pieper, Dortmund (DE); Armin Meisenberg, Dortmund (DE)

(73) Assignee: TE Connectivity Sensors Germany GmbH, Dortmund (DE)

( * ) Notice: Subject to any disclaimer, the term of this patent is extended or adjusted under 35 U.S.C. 154(b) by 0 days.

(21) Appl. No.: 17/539,979

(22) Filed: Dec. 1, 2021

(65) Prior Publication Data

US 2022/0170729 A1    Jun. 2, 2022

(30) Foreign Application Priority Data

Dec. 2, 2020  (EP) ..................... 20211153

(51) Int. Cl.
  *G01B 7/00* (2006.01)
  *G01D 5/20* (2006.01)
(52) U.S. Cl.
  CPC ........... *G01B 7/003* (2013.01); *G01D 5/2073* (2013.01)
(58) Field of Classification Search
  CPC .. G01D 5/2073; G01D 5/2053; B60G 17/019; B60G 2400/252; B60G 2204/112; B60G 2401/17; G01B 7/003; F16F 2230/08
  See application file for complete search history.

(56) References Cited

U.S. PATENT DOCUMENTS

| 2002/0035423 | A1* | 3/2002 | Shank | B60G 17/01933 280/5.514 |
| 2019/0128702 | A1* | 5/2019 | Qama | G01D 5/2073 |
| 2021/0255002 | A1* | 8/2021 | Ocket | G01D 5/2006 |

FOREIGN PATENT DOCUMENTS

| EP | 0743508 A2 | 11/1996 |
| EP | 3495781 A1 | 6/2019 |
| EP | 3627113 A1 | 3/2020 |
| EP | 3702738 A1 | 9/2020 |

OTHER PUBLICATIONS

Extended European Search Report, European Application No. 20211153. 0-1010, European Filing Date, Apr. 19, 2021.

* cited by examiner

*Primary Examiner* — Jermele M Hollington
*Assistant Examiner* — Suresh K Rajaputra
(74) *Attorney, Agent, or Firm* — Barley Snyder

(57) ABSTRACT

An Eddy current sensor device includes a sender member emitting a magnetic field and two sensing members. A central position sensing member includes a pair of central sense coils each being formed by a plurality of turns, and an edge position sensing member includes a pair of edge sense coils each being formed by a plurality of turns.

20 Claims, 6 Drawing Sheets

EDDY CURRENT SENSOR DEVICE FOR MEASURING A LINEAR DISPLACEMENT

CROSS-REFERENCE TO RELATED APPLICATIONS

This application claims priority to European Patent Application No. 20211153.0, filed Dec. 2, 2020, the entire disclosure of which is incorporated by reference herein.

FIELD OF THE INVENTION

The present disclosure relates to sensors, and more specifically, to an Eddy current sensor device.

BACKGROUND

Linear sensors are used in many devices, for example shock absorbers, for detecting the linear position or displacement of the shocks components. These sensors include Linear Variable Differential Transformers (LVDTs), Linear Variable Displacement Transducers, or simply Differential Transformers or DTs. Typically, sensors consist of multiple components, including at least primary and secondary windings, as well as associated external processing electronics. These components may be integrated into existing shock absorber components, such as its tubes (e.g., the sensor coil windings wound around large diameter shock absorber tubes). In this way, a disadvantage of the prior art sensor devices is that large tubes with large wire coils are needed. This results in high assembly effort and expense.

Sensor solutions which simplify integration into these types of applications, while retaining performance and reliability, are desired.

SUMMARY

An Eddy current sensor device includes a sender member emitting a magnetic field and two sensing members. A central position sensing member includes a pair of central sense coils each being formed by a plurality of turns, and an edge position sensing member includes a pair of edge sense coils each being formed by a plurality of turns.

BRIEF DESCRIPTION OF THE DRAWINGS

The invention will now be described by way of example with reference to the accompanying Figures, of which.

DETAILED DESCRIPTION OF THE EMBODIMENTS

Figure 1:
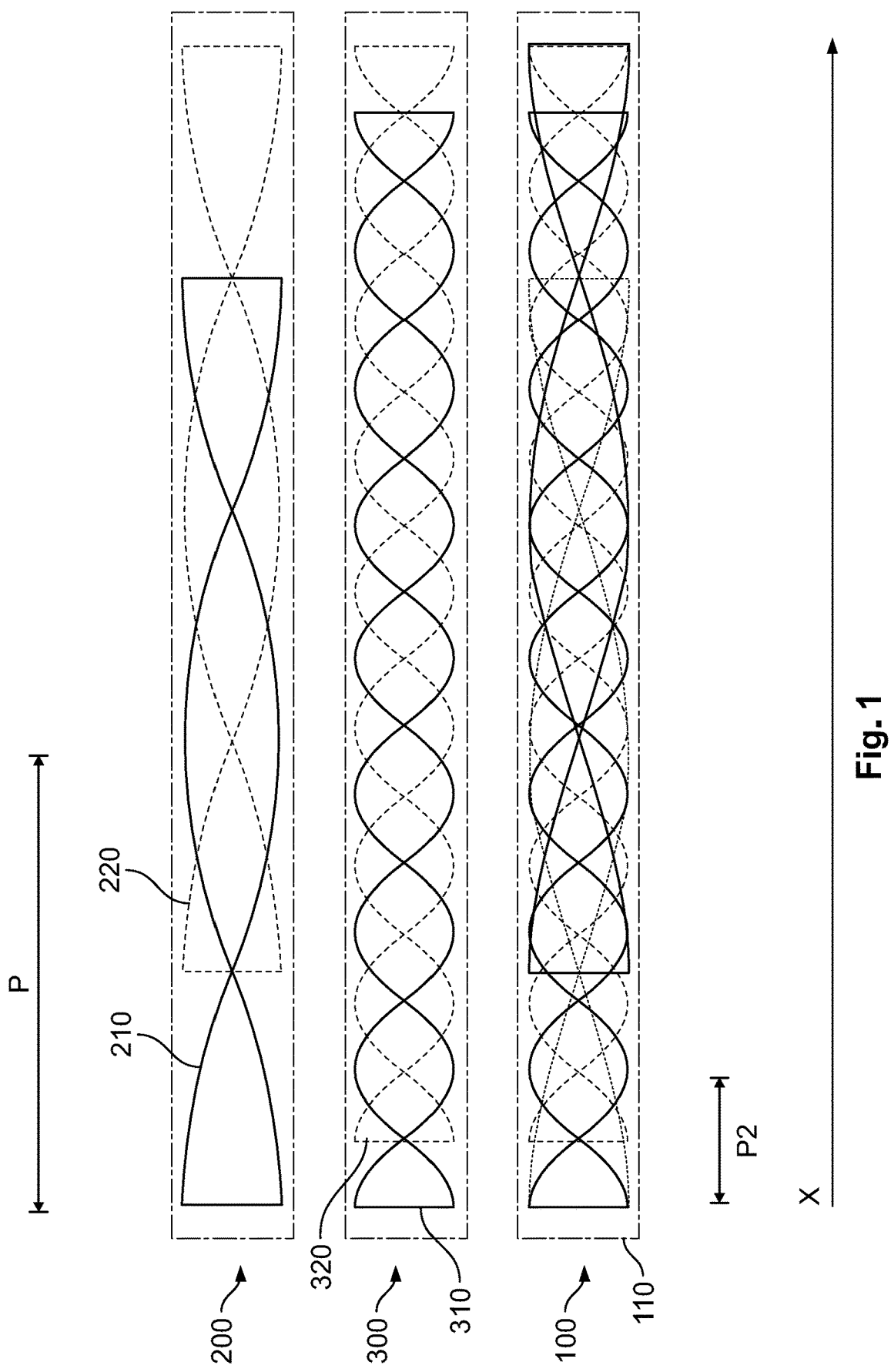
FIG. 1 is a schematic arrangement of the sense coils.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 5:
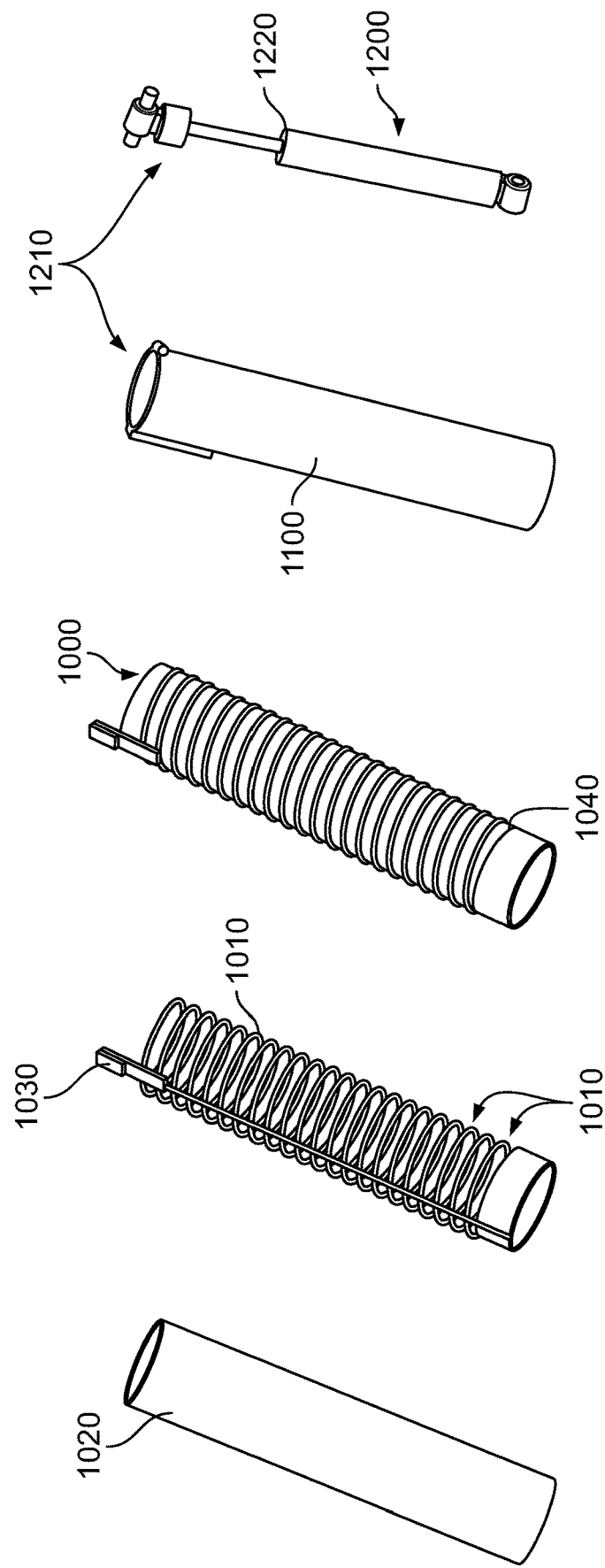
FIG. 5 is a sensor for a shock absorber.

By way of background, FIG. 5 shows a linear sensor device 1000 for a shock absorber 1200. In particular, the sensor device 1000 enables detecting the linear position and movement of the shock absorber. For example, the sensor device 1000 is an LVDT. The LVDT sensor 1000 comprises a grooved inner plastic tube 1020 for accurate positioning of the transformer windings. Further, the sensor comprises three coils 1010, namely one primary winding and two secondary windings; the secondary windings are partly wired over the primary winding. The three coils 1010 consist of 20 to 40 turns each. The transformer winding and embedded electronics 1030 with integrated temperature sensor and electrical connector are mounted on to the supporting tube 1040 and over molded by a dust tube 1100, which has an interface to a shock absorbers piston rod top plate 1210. In particular, the transformer coil and electronics are integrated into a shock absorber plastic dust tube 1100, utilizing the shock absorber 1200 as a core, which is connected to the suspension axle. Thus, the linear position of a boundary 1220, i.e. the boundary between the piston and a cylinder, of the shock absorber 1200 can be determined.

As will be set forth in greater detail herein, embodiments of the present disclosure improve on the above arrangement using an Eddy current sensor, wherein the number of turns of each sense coil of the Eddy current sensor is odd. Such a configuration reduces errors caused by tilts between the conductive element, i.e., the shock absorber core, and a sensing plane, i.e., the area where the sensing coils are arranged, and thus allows the use of an Eddy current sensor even in a configuration where tilt errors occur.

Figure 6:
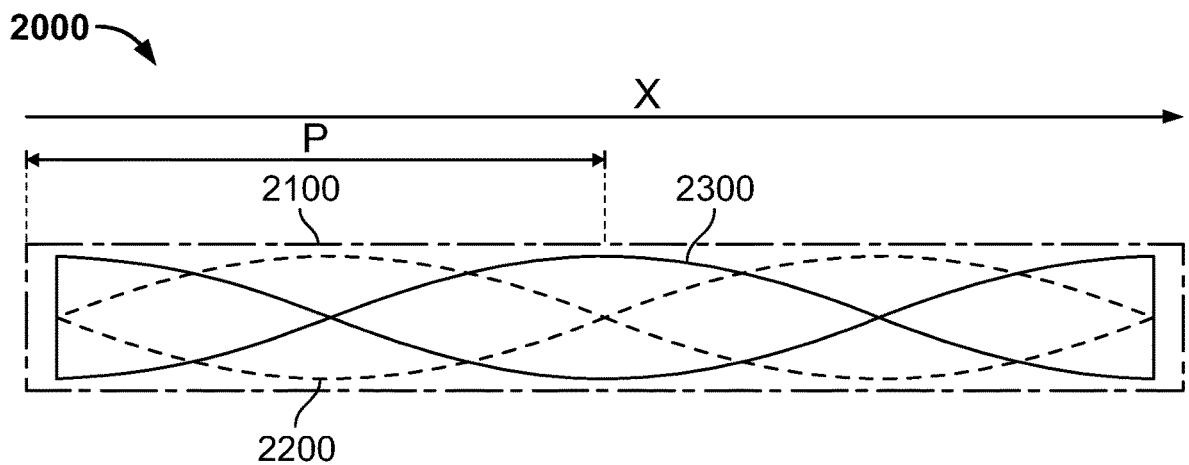
FIG. 6 is a schematic arrangement of an Eddy sensor.

The present disclosure will now be explained in more detail with reference to the Figures. Firstly, with reference to FIGS. 6 to 12, the technological function of an Eddy current sensor will be explained. FIG. 6 is a schematic arrangement of an Eddy current sensor. In particular, the Eddy current sensor 2000 comprises a sender member 2100, a first sense coil 2200, and a second sense coil 2300, which can be all planar electric coils. The sender member 2100 surrounds the first and second sense coil.

Figure 7:
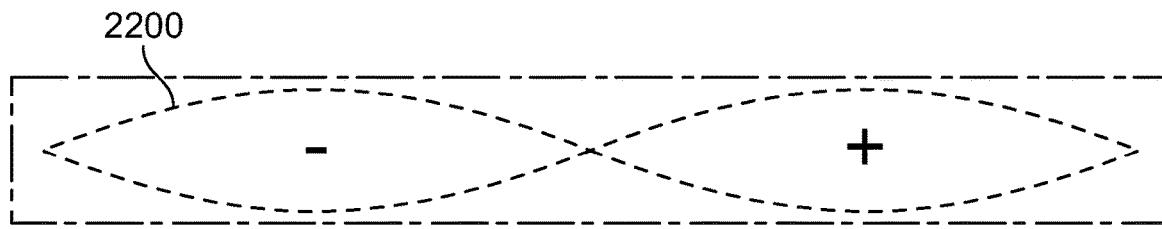
FIG. 7 is a detail of FIG. 6.

The first sense coil 2200, which is shown in detail in FIG. 7, consists of two turns arranged side by side. This shape may be referred to as an eye shaped sense coil. As shown in FIG. 7, the turns arranged side by side and can be wound in opposite direction, i.e., one is wound clockwise and one is wound counter clockwise, which is indicated by the signs plus + and minus −. Such a configuration enables that the net voltage induced by the sensing member is zero. In particular, this is caused because the areas shaped by each turn is equal and the sender member is arranged symmetrical with regard to the shaped areas.

Figure 8:
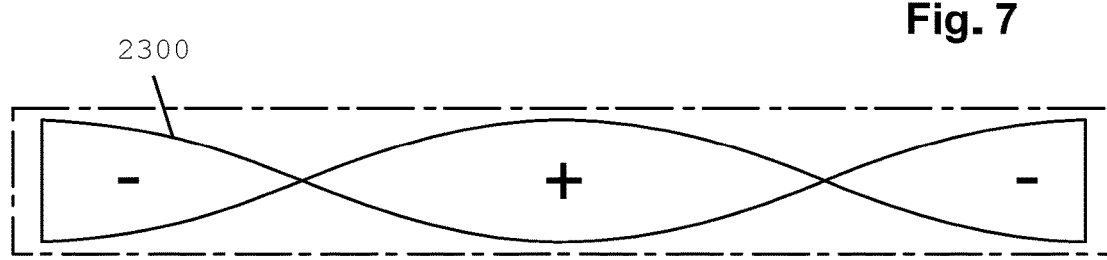
FIG. 8 is a further detail of FIG. 6.

The second sense coil 2300, which is shown in FIG. 8, can consist of three turns arranged side by side. This shape may be referred to as a candy-shaped coil. As shown in FIG. 8, the turns arranged side by side are wound in opposite direction, i.e. the edge turns are wound clockwise, and the central turn is wound counter clockwise, which is indicated by the signs + and −. Such a configuration enables that the net voltage induced by the sensing member is zero. In particular, this is caused because the sum of areas having the same sign, i.e. the both edge areas having the minus sign, is equal to the sum of areas having the opposing sign, i.e. the central area having the plus sign, and the sender member is arranged symmetrical with regard to the shaped areas.

As shown in FIG. 6, the area shaped by each sense coil can follow a periodic function with period P. The areas of the first and second sense coil can be congruent when shifted by half the period P. Further, the areas formed by each sense coil can be congruent when shifted by the period P. Thus, the Eddy current sensor 2000 covers a measurement range of two periods P. This configuration allows an absolute position measurement along a linear axis X of a conductive element.

Figure 9:
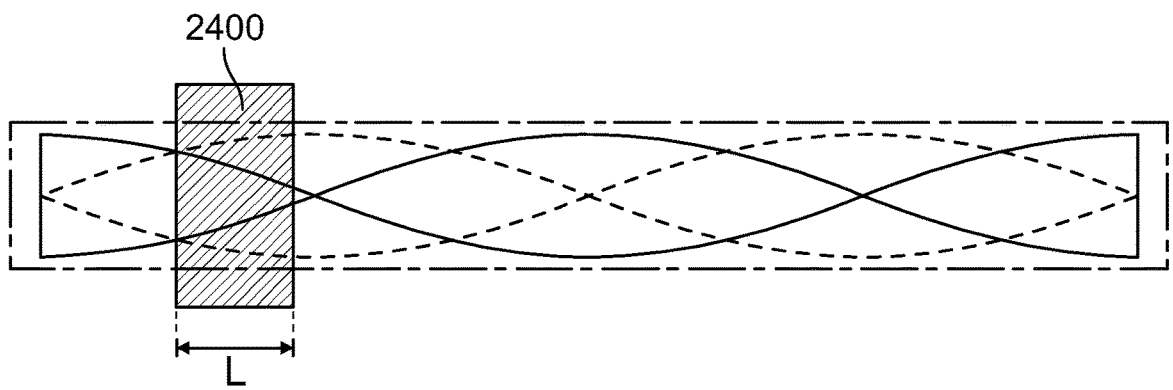
FIG. 9 is a schematic of the Eddy sensor of FIG. 6 in combination with a conductive element.

Further, FIG. 9 is a schematic arrangement of the Eddy current sensor of FIG. 6 with a conductive element 2400. The dimension L of the conductive element along the linear axis X, is indicated in FIG. 9. The length L is relatively small compared to the measurement range of two periods P of the Eddy current sensor. Such a configuration allows measuring the positon of the center of gravity of the conductive element 2400.

Figure 10:
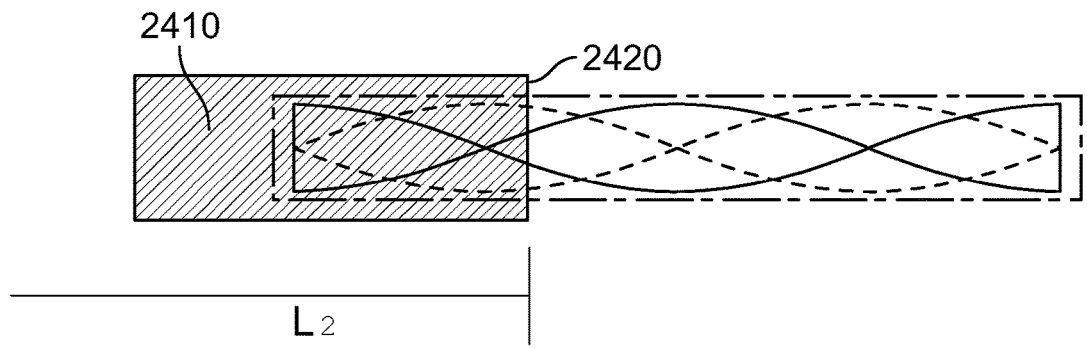
FIG. 10 is a schematic arrangement of an Eddy current sensor, when measuring the boundary position of a conductive element.

FIG. 10 shows the case when the length L2 of a conductive element 2410 is large compared to the measurement range of two periods P of the Eddy current sensor. The dimension L2 of the conductive element 2410 along the linear axis X is indicated in FIG. 10. In particular, the conductive element has a boundary 2420. An opposing boundary is not indicated, as the conductive element is not limited at the opposing side. In such a configuration, only the boundary 2420 of the conductive element 2410 can be measured.

Figure 11:
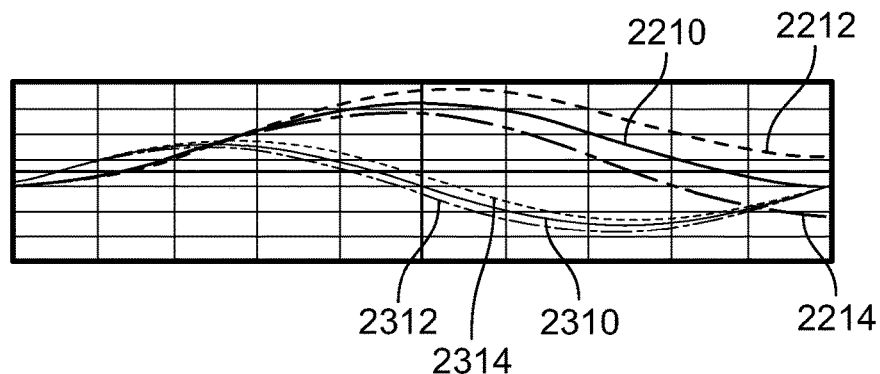
FIG. 11 is a graph showing simulated signals of the Eddy current sensor as shown in the configuration of FIG. 10.

Simulated measurement results of the configuration of FIG. 10 are shown in FIG. 11. In particular, the simulated voltages of the eye-shaped senor coil 2210 and simulated voltages of the candy-shaped senor coil 2310 are shown for a boundary position of the conductive element for the complete measurement range of 2P.

Further, in FIG. 11, are over-plotted errors caused by a tilt error. As used herein, a tilt error is caused by the distance between the boundary of the conductive element and the sensing plane, i.e. it increases or decreases along the linear axis. In particular, simulated signal values 2212 and 2214 show the influence to the signal provided by the eye-shaped sense coil. Further, simulated values 2312 and 2314 show the influence to the signal provided by the candy-shaped sense coil.

Figure 12:
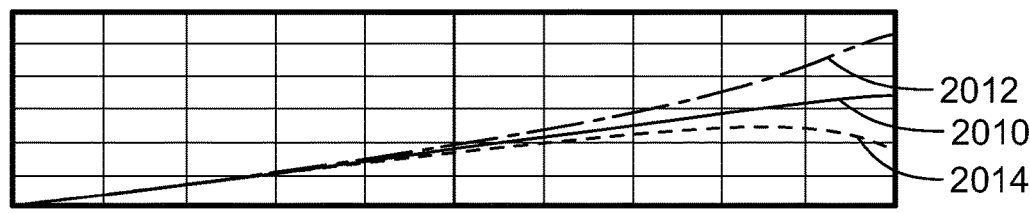
FIG. 12 is a graph showing simulated position data derived from the signal data as shown in FIG. 11.

FIG. 12 shows the simulated absolute position value of the boundary of the conductive element over the measurement range. Ideally, the simulated value show that the determined value, e.g. determined by an arctan processing, is a linear function 2010 uniquely assigning a position of the boundary to one determined measurement signal.

Notably, as shown by the simulated errors caused by a constant tilt, the use of an Eddy current sensor for determining the absolute position is very limited when assuming that a boundary of a conductive element is measured, i.e., the configuration shown in FIG. 10. In more detail, as shown by the simulated error values 2012 and 2014, a tilt error accumulates over the measurement range resulting in a not unique identification of the position at one end of the measurement range. In particular, error value 2014 shows that two simulated signals correspond to one position of the boundary of the conductive element. Consequently, known Eddy current sensors cannot be used to determine the absolute position of a boundary of a conductive element when a tilt of the conductive element in relation to the coil plane is possible.

FIG. 1 shows an Eddy current sensor 100 that is adapted to measure the boundary of a conductive element. In more detail, the Eddy current sensor 100 comprises a sender member 110, a central position sensing member 200, and an edge position member 300. For the description of the sender member 110 is referred to the above description with reference to FIGS. 6-12. By way of example only, the central position sensing member 200 and the edge position member 300 are shown individually in the two top plot panels of FIG. 1. The combination of the two top plot panels results in the Eddy current sensor 100 shown in the bottom plot panel.

In more detail, the central position member 200 comprises pair of coils 210, 220. Each coil 210 220 is candy-shaped and for the description of the shape is referred to FIG. 8.

The area shaped by each sense coil 210, 220 can follow a periodic function with period P. The area shaped by the sense coil 210 is congruent with the area shaped by the sense coil 220 when shifted by half the period P. Further, the areas of each of the sense coil 210, 220 are congruent when shifted by the period P. Further, the central position member 200 covers a measurement range of two periods P.

Figure 2:
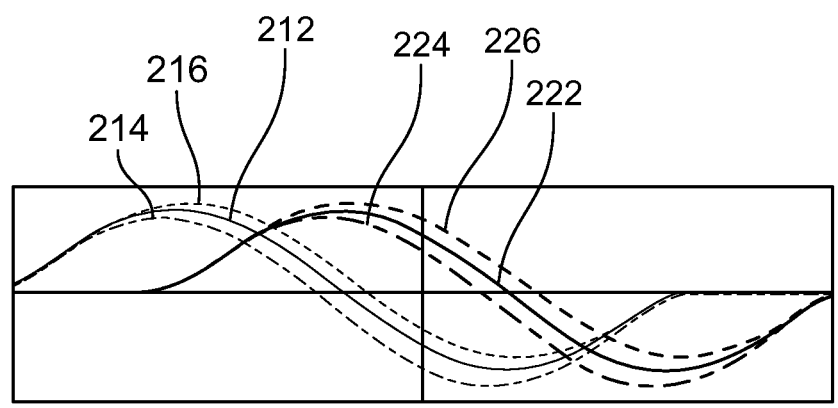
FIG. 2 is a graph showing simulated data of a central sense coils.

Simulated measurement results of the configuration of central positon sensing member 200 of FIG. 1 are shown in FIG. 2. In particular, FIG. 2 shows the simulated voltages of the candy-shaped senor coils 212 and 222 are shown for a boundary position of the conductive element for the complete measurement range of 2P.

Over plotted in FIG. 2 are errors values caused by a tilt error, i.e. the distance between the boundary of the conductive element and the sensing plane increases or decreases. In particular, simulated values 214 and 216 show the influence to the signal provided by the candy-shaped sense coil 210. Further, simulated values 224 and 226 show the influence to the signal provided by the candy-shaped sense coil 220.

Figure 3:
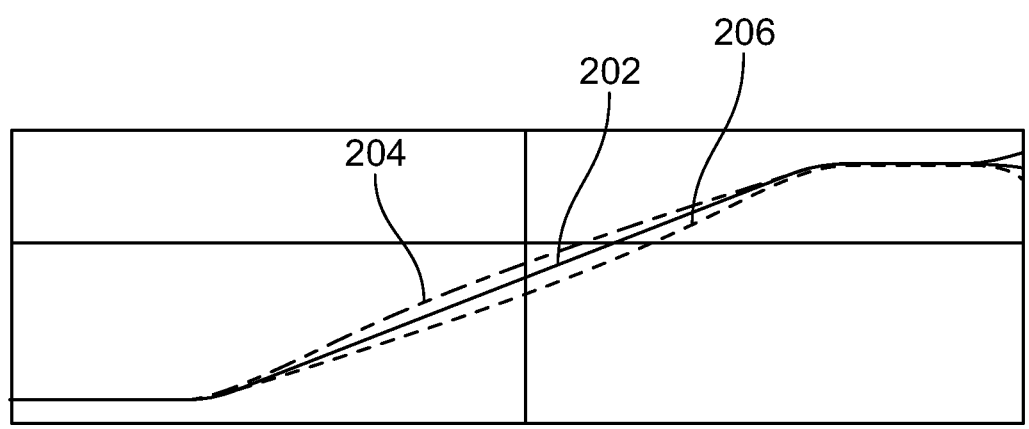
FIG. 3 is graphs showing simulated data of a central position member.

Further, FIG. 3 shows the simulated absolute position value of the boundary of the conductive element over the measurement range. Ideally, the simulated value show that the determined value, e.g. determined by an arctan processing, is a linear function 202 uniquely assigning a position of the boundary to one determined measurement signal in a measurement range of three half periods P.

As shown by the simulated errors due to a tilt, an Eddy current sensor having two candy-shaped sense coils can be used for determining the absolute position when assuming that a boundary of a conductive element is measured. In more detail, as shown by the simulated error values 204 and 206, a tilt error does not accumulate over the measurement range. Rather, it compensates at the limits of the measurement range thereby enabling a unique identification of the position at the ends of the measurement range. Consequently, such an Eddy current sensors with a pair of sense coils each having an odd number of turns can be used to determine the absolute position of a boundary of a conductive element.

In more detail, the odd number of turns enables that the areas having the same sign, is for example, shown in FIG. 8, to have the same centroid. Consequently, the tilt errors, which accumulate when the boundary of the conductive element is displaced along the linear axis, do not disturb the measurement result. Rather, these errors are cancelled out by using an Eddy current sensor having a pair of sense coils, each sense coil having an odd number of turns. This, however, is not possible in the case of a sense coil having an Eye shape, as shown in FIG. 7.

Referring again to FIG. 1, the edge position member 300 is described. The edge position member 300 can comprise a pair of coils 310, 320. Each coil 310, 320 is candy-shaped and for the description of the shape is referred to FIG. 8. The area shaped by each sense coil follows a periodic function with period P2. The area shaped by the sense coil 310 is congruent with the area shaped by the sense coil 320 when shifted by half the period P2. Further, the areas of each of the sense coil 310 and 320 are congruent when shifted by the period P2. Further, the central position member 200 covers a measurement range of eight periods P2.

Figure 4:
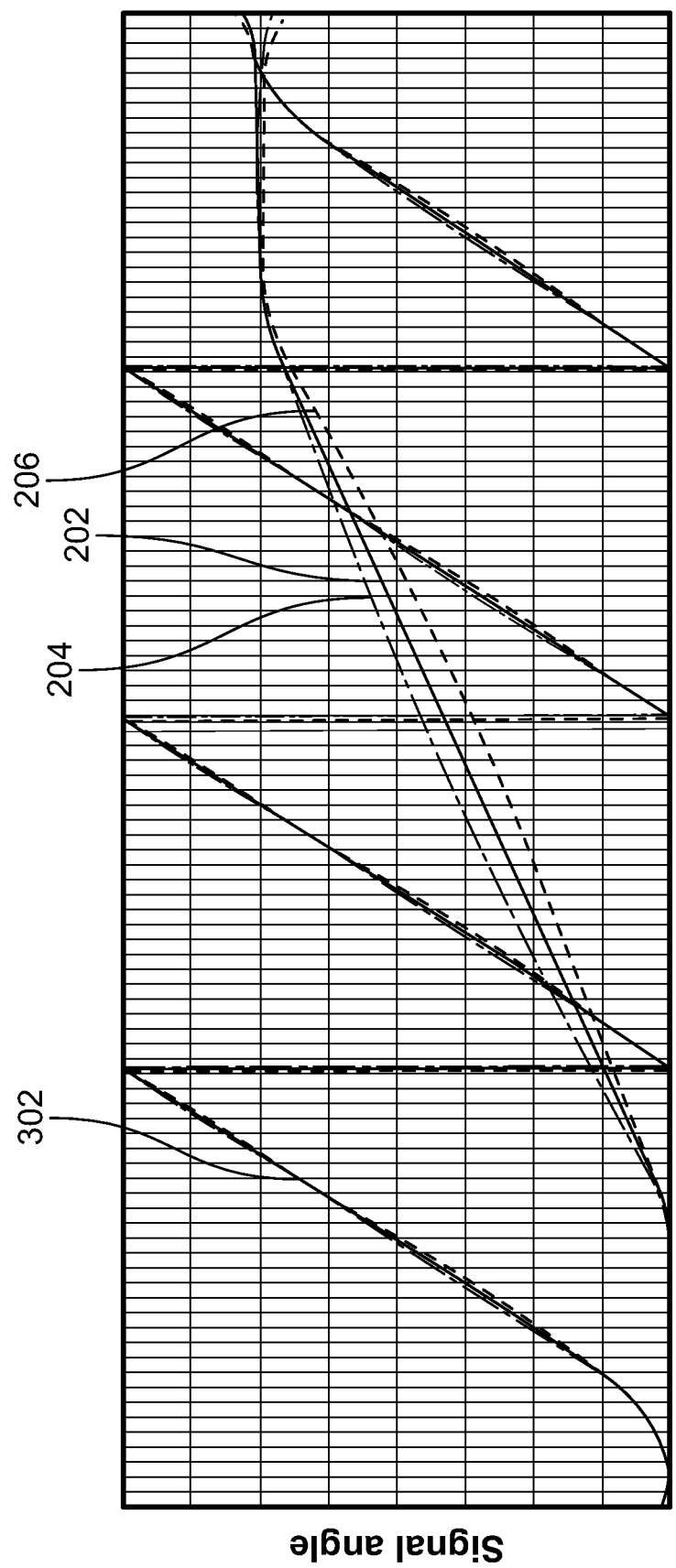
FIG. 4 is a graph showing simulated data of a central position member and an edge position member.

FIG. 4 shows the results of FIG. 3. Additionally, FIG. 4 is over plotted the contribution of the edge sense member 300. In more detail, the simulated value of the central sense coil 200 shows that the determined value is a linear function 202, uniquely assigning a position of the boundary of the conductive element to one value in a measurement range covering three half periods P. The simulated value of the edge sense coil 300 show that the determined value is a saw tooth function 302 assigning a position of the boundary of the conductive element to a plurality of values in a measurement range covering the full two periods P. In other words, the edge sense coil 300 provides a relative resolution that extends the measurement nearly to the complete measurement range.

As shown in the embodiment of FIGS. 1-4, each central sense coil 210 and 220 can have three turns. Such a configuration allows an absolute measurement of the position. Alternatively, the number of turns of each edge sense coil and the number of each central sense coil may be selected that the numbers are coprime. Consequently, by the ratio an absolute position determination is possible, i.e., using the principle of a Vernier Scale.

Further, according to an aspect in case that each central sense coil 210 and 220 has three turns, each edge sense coil 310, 320 can have nine turns. Such an arrangement is a compromise between extending the measurement range of absolutely determining a boundary of the conductive element and increasing the relative resolution information provided by the edge sense coil.

A diameter of end turns of the edge sense coils can be smaller than a diameter of end turns of the central sense coils along the linear axis. As used herein, a diameter of a turn is a straight-line segment that passes through the center of the turn and whose endpoints lie on the turn. In other words, the end turns of the edge sense coils 310, 320 can be shorter in length along the linear axis than dimensions of end turns of the central sense coils 210, 220. Thus, the length of the period P2 is smaller than the length of the period P. Such a configuration allows that the measurement range of absolutely determining a boundary of the conductive element can be extended with an edge sense coils 310, 320.

Moreover, as shown in FIG. 1 the central sense coil 200 and the edge sense coil 100 can be arranged so as to overlap in the sensing plane (bottom plot in FIG. 1). Such a configuration allows a compact sensor arrangement. As shown in FIG. 1 the sender member 110 can surround the central sense coil 200 and the edge sense coil 100. Such a configuration allows a compact sensor arrangement.

Further, as shown in FIG. 1 the sender member 110, the central sense coil 200 and the edge sense coil 100 can be arranged symmetrically in the sensing plane, i.e. having at least on mirror symmetric axis, preferably two mirror symmetric axes. Such a configuration allows a particular easy processing of data.

Like the embodiment of FIG. 5, the sensor 100 can comprise a controller, which can be embodied as a microcontroller. The controller is used for controlling the power provided sender element. Further, the controller can directly receive the varying voltages induced in the sensing coils. The data of the controller can then be processed in a further, non-depicted module. The controller is arranged for example on a carrier with at least one of the central sense member, the edge sense member, and/or the sender member.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An Eddy current sensor device, comprising:
   a sender member emitting a magnetic field;
   a central position sensing member including a pair of central sense coils each being formed by a plurality of turns; and
   an edge position sensing member including a pair of edge sense coils each being formed by a plurality of turns.

2. The sensor device of claim 1, wherein the central position sensing member outputs a central position signal dependent on a linear displacement of a boundary of a conductive element, and the edge position sensing member outputs an edge position signal dependent on the linear displacement of the boundary of the conductive element.

3. The sensor device of claim 2, wherein the turns of each central sense coil are arranged side by side along a linear axis in the sensing plane to cover a measurement range.

4. The sensor device of claim 3, wherein the turns of each edge sense coil are arranged side by side along the linear axis in the sensing plane.

5. The sensor device of claim 4, wherein a number of turns of each of the central sense coils and the edge sense coils is odd.

6. The sensor device according to claim 4, wherein a diameter of end turns of the edge sense coils along the linear axis is smaller than a diameter of end turns of the central sense coils along the linear axis.

7. The sensor device according to claim 4, wherein a number of turns of at least one of the edge sense coils is greater than a number of turns of at least one of the central sense coils.

8. The sensor device according to claim 4, wherein each sense coil of a pair of sense coils shapes an area, the pair of sense coils being at least one of the pair of central sense coils and the pair of edge sense coils, the both areas delimited by one pair of sense coils being only partly overlapping in a sensing plane.

9. The sensor device according to claim 8, wherein the both areas delimited by the pair of sense coils are congruent with each other when shifted along the linear axis.

10. The sensor device according to claim 8, wherein the shape of the area of each of the pair of sense coils resembles one periodic function in a direction perpendicular to the linear axis.

11. The sensor device according to claim 10, wherein the measurement range is at least equal to twice a period of the periodic function.

12. The sensor device according to claim 11, wherein each area delimited by the pair of sense coils are shifted by half of the period of the periodic function along the linear axis.

13. The sensor device according to claim 4, wherein the central position sensing member and the edge position sensing member overlap in at least one of the direction along the linear axis and the direction perpendicular to the linear axis the sensing plane.

14. The sensor device according to claim 1, wherein abutting turns of a sense coil are wound in opposite directions, the sense coil being at least one of the central sense coils and the edge sense coils.

15. The sensor device according to claim 1, wherein the number of turns of each of the central sense coils is three.

16. The sensor device according to claim 15, wherein the number of turns of each of the edge sense coils is nine.

17. The sensor device according to claim 1, wherein the number of turns of the edge sense coil and the number of turns of the central sense coils are co-prime.

18. The sensor device according to claim 1, wherein at least one of the sender member or at least one of the central sense coils and the edge sense coils lie in a plane.

19. The sensor device according to claim 1, wherein at least one of the central sense coils or the edge sense coils comprises a conductive path defined on a printed circuit board.

20. A sensor assembly, comprising:
  a non-magnetic and non-conductive sleeve adapted to receive a conductive element; and
  a sensor device integrated into the sleeve, including:
    a sender member emitting a magnetic field;
    a central position sensing member outputting a central position signal dependent on the linear displacement of the boundary of the conductive element, the central position sensing member including a pair of central sense coils each being formed by a plurality of turns; and
    an edge position sensing member outputting an edge position signal dependent on the linear displacement of the boundary of the conductive element, the edge position sensing member including a pair of edge sense coils each being formed by a plurality of turns.

* * * * *